United States Patent [19]

Martin

[11] Patent Number: 4,717,113
[45] Date of Patent: Jan. 5, 1988

[54] SEGMENTED INJECTION MOLD SYSTEM

[75] Inventor: Harold B. Martin, West Caldwell, N.J.

[73] Assignees: EEE Co., Inc., Port Washington, N.Y.; Martin Design, West Caldwell, N.J. ; a part interest

[21] Appl. No.: 11,459

[22] Filed: Feb. 6, 1987

Related U.S. Application Data

[63] Continuation of Ser. No. 745,891, Jun. 18, 1985, abandoned.

[51] Int. Cl.⁴ .............................................. B29C 45/40
[52] U.S. Cl. ...................................... 249/63; 249/152; 249/180; 249/184; 264/334; 425/422; 425/436 R; 425/438; 425/441; 425/554; 425/556; 425/DIG. 5; 425/DIG. 58
[58] Field of Search ............... 425/236, 282, 286, 537, 425/554, 556, 436 R, 436 RM, 438, 422, 441, 442, DIG. 5, DIG. 58, DIG. 218, 577, 330, 450.1, 451.7, 451.9; 264/334; 249/152, 178, 180, 184, 57, 63

[56] References Cited

U.S. PATENT DOCUMENTS

| | | | |
|---|---|---|---|
| 3,293,697 | 12/1966 | Balint | 425/DIG. 58 |
| 3,811,645 | 5/1974 | Feist | 425/DIG. 5 |
| 3,865,529 | 2/1975 | Guzzo | 425/DIG. 5 |
| 3,905,740 | 9/1975 | Lovejoy | 425/556 |
| 4,082,245 | 4/1978 | Santos | 425/DIG. 5 |
| 4,286,766 | 9/1981 | von Holdt | 425/438 |
| 4,362,291 | 12/1982 | Fuke et al. | 425/438 |

Primary Examiner—Jay H. Woo
Assistant Examiner—Timothy W. Heitbrink
Attorney, Agent, or Firm—Henry Sternberg; Bert J. Lewen

[57] ABSTRACT

An injection molding system is provided with a plurality of wall segments which are displaceable substantially radially for forming a substantially continuous wall which forms an internal wall of a hollow region which is intended to be filled with molten molding material. In a preferred embodiment, the wall segments are urged into sliding communication with one another and sealable engagement with a further wall portion by operation of an actuator assembly which is provided with canted pins which cause the wall segments to be moved radially inwardly and outwardly in response to orthogonal displacement of the actuator assembly. The invention is therefore particularly suited for forming molded articles having hollow interiors and/or internally ribbed portions. In an embodiment where a slot is desired in the molded article, a slot core is arranged to communicate with the molten molding material, so as to form the slot, and an ejection mechanism. During ejection, the slot core lifts the molded article out of the mold and is also extracted from the molded article during the ejection operation.

14 Claims, 3 Drawing Figures

SEGMENTED INJECTION MOLD SYSTEM

This is a continuation of co-pending application Ser. No. 745,891 filed on June 18, 1985, now abandoned.

BACKGROUND OF THE INVENTION

This invention relates generally to systems for producing injection molded articles, and more particularly, to an arrangement and method of forming internally ribbed injection molded articles whereby material usage is minimized and manufacturing speed is improved.

It is generally desired in certain injection molded articles, such as display frames of the type which are used for pictures, cards, and other items, that an aesthetically pleasing dimensioning and configuration be maintained to achieve a desired decorative appearance. Generally, such a desired decorative appearance is achieved, illustratively in the display frame art, by providing a relatively large frame thickness such that a somewhat massive appearance is produced. Display frames of the type which are produced by conventional injection molding systems achieve the desired massive appearance by using large amounts of molding material.

It is a problem with a conventional frame that the polymeric or other molding materials are expensive. Of equal importance, however, is the fact that when a massive injection molded article is solidifying, a surface irregularity is produced caused by internal shrinkage of the mold material. This results in a condition known as "sink" whereby the central region of a surface is depressed inwardly. In addition to the high cost and surface irregularities of massive injection molded articles, such articles are plagued by the further problem that their manufacture proceeds at a relatively slow rate. This is caused by the fact that a relatively long solidification period is required before the article can be removed from the mold. In essence, a relatively long machine cycle is required for producing massive injection molded articles.

The prior art has thrust at the problems associated with massive injection molded articles by creating a product having an internally ribbed appearance. Generally, the formation of internal ribs required additional machining operations after molding was completed. Thus, although some molding material was salvaged by such post-molding machining, this technique did not eliminate the problem of surface sink. Additionally, the subsequent machining of a massive injection molded article does not solve the problem of extended machine cycle times. Thus, the conventional approach to producing internally ribbed articles, such as display frames, is expensive and complex.

It is, therefore, an object of this invention to provide a simple and inexpensive molding system. It is another object of this invention to provide a simple and inexpensive molding system which is suitable for injection molding.

It is also an object of this invention to provide a mold arrangement for manufacturing injection molded products which are not subject to surface sink defects.

It is a further object of this invention to provide a mold system for producing internally ribbed products whereby aesthetic and decorative dimensions are maintained and a substantial reduction in the usage of molding material is attained.

It is additionally an object of this invention to provide a mold system for producing injection molded display frames.

It is also another object of this invention to provide a mold system for manufacturing display frames having decoratively large face width dimensions, while minimizing consumption of the molding material.

It is a yet further object of this invention to provide a mold arrangement for producing display frames which are internally ribbed longitudinally along respective sides thereof.

It is also an additional object of this invention to reduce the time required to manufacture an injection molded article.

It is still another object of this invention to reduce machine cycle times in the injection molding manufacture of articles.

It is a still further object of this invention to improve the efficiency with which an article is removed from an injection mold system.

It is yet another object of this invention to provide an injection mold for an internally ribbed frame member wherein the frame member is easily removed from the mold.

It is additionally a further object of this invention to provide an injection mold system for a display frame which does not require a mold core dedicated exclusively to the forming of a slot through the display frame.

SUMMARY OF THE INVENTION

The foregoing and other objects are achieved by this invention which provides an injection molding arrangement having a continuous outer wall for defining an outermost extent of an article to be molded. An inner wall which, in combination with the outer wall, forms an enclosed region having a configuration which conforms to the desired shape of the article to be molded, is formed of a plurality of wall segments which are displaceable substantially radially outwardly for forming the inner wall, and substantially radially inwardly, for collapsing the inner wall and permitting access to the molded article. When the wall segments are in their radially outward locations, the resulting inner wall engages substantially sealably with the outer wall to form the enclosed region.

In a particularly advantageous embodiment of the invention, the outer wall is arranged to form an outer surface which is closed onto itself. Illustratively, the location of such an outer wall may correspond to the outer perimeter of a display frame, assuming a display frame is the article desired to be molded. Additionally, the inner wall, which is formed by the adjacent orientation of the various wall segments, may be provided with one or more longitudinally extending ribs, such that such a longitudinal rib extends inwardly with respect to the substantially sealed hollow volume. Thus, such a rib occupies space within the region where the molten molding material is received, thereby reducing the amount of material which is consumed for each such article.

The motion of the wall segments is controlled and guided by an actuation arrangement which is provided with a plurality of sliding pin members. Each of the pin members is associated with a respective one of the mold segments and, in one embodiment, extends therethrough at a predetermined angle with respect to a major plane in which the wall segments are moved radially. Thus, when the sliding pin members and an associated actuation mechanism are moved in directions which are substantially orthogonal with respect to the major plane, the wall segments are moved correspondingly in their respective substantially radial directions of travel.

In one specific embodiment, the sliding pin members are each canted so as to be directed substantially inwardly so as to point to a substantially central region. Thus, in embodiments of the invention where the outer wall is affixed to a first platen, and the wall segments are attached to a second platen which is movable with respect to the first platen, a lifting of the actuation arrangement results in the wall segments being moved substantially radially inwardly. The consequent removal of the inner wall permits access to the molded article, Further lifting removes the wall segments thereby permitting ejection of the molded product. Conversely, as the first and second platens are brought closer to one another, the respective wall members are brought into communication with the first platen and urged by the sliding pin members to be displaced substantially radially outwardly such that the inner wall is formed. Moreover, the thus-formed continuous inner wall formed by the wall segments is urged into a substantially sealed communication with the outer wall, and thereby forms the substantially sealed volume which is to receive the molten molding material once again.

In embodiments of the invention where the inner wall which is formed by the wall segments is provided with a rib, it is clear that ejection of the molded article can not be achieved without the collapsing of the wall by the urging of the wall segments radially inward, and therefore away from, the molded article. Of course, in practical embodiments of the invention, a plurality of such ribs would be provided so as to effect a substantial reduction in the usage of the molding material. In addition, the use of such ribs, in reducing the massiveness of the molded article, prevents the formation of surface sink irregularities while maintaining a massive appearance of the article. Of course, collateral other cost savings are achieved, such as shipping costs of bulk quantities of such molded articles.

In an embodiment of the invention where the article to be molded is a display frame, it is desirable that a slot be provided for permitting introduction of a card, photograph, or other item desired to be displayed into the frame. Conventional injection molding arrangements require that such a slot be formed by the introduction of a slot core into the mold which must subsequently be removed from the molded article after ejection from the mold. In the present invention, however, a slot core is provided in combination with an ejection actuator arrangement, such that both, the formation of the slot and the ejection of the molded product are facilitated. In accordance with the invention, a portion of the slot core is coupled to a member which is engaged with a sliding pin which is canted away from the molded article. Thus, during ejection, the slot core is urged initially upward so as to remove the molded article from the first platen, after the inner wall has been collapsed. Simultaneously, however, the slot core is moved away from the molded article such that it is eventually decoupled therefrom. Thus, in addition to improving the speed at which the molded articles are ejected from the mold, the present invention also eliminated the need for the additional step of removing the slot core from the molded article.

In accordance with a method aspect of the invention, a substantially sealed hollow volume having a configuration corresponding to the article desired to be molded is formed by producing a substantially continuous surface which faces the interior of the substantially sealed hollow volume. The substantially sealed continuous surface is formed by a plurality of displaceable mold segments, each of which forms a corresponding portion of the substantially continuous surface. The substantially continuous surface is formed by displacing the mold segments in substantially radial directions of travel with respect to one another between a first position where the substantially continuous surface is formed, and a second position where the substantially continuous surface is collapsed. Such displacement is achieved by moving a carrier member which is coupled to the mold segments. In a preferred embodiment, the carrier member is moved in a direction which is substantially orthogonal with respect to the directions of travel of the mold segments.

As the mold segments are urged radially outwardly so as to form the substantially continuous surface, adjacent ones of the mold segments are brought into a sliding communication. Such a communication between the adjacent mold segments ensures that the resulting inner wall is substantially continuous and sealed. A further urging of the wall segments radially outwardly increases the compression forces between the adjacent mold segment, and also urges the mold segments to form a substantially sealed communication with the wall member which forms the outermost surface of the substantially sealed hollow volume. After the thus-produced substantially hollow volume is filled with the molding material and such material has solidified, the invention provides the further step of ejecting the molded article after the substantially continuous surface has been collapsed by the urging of the wall segments substantially radially inwardly with respect to one another and the removal of the wall segments from the first platen. In accordance with the invention, the step of ejecting the molded article also includes the step of decoupling the slot core from the molded article.

BRIEF DESCRIPTION OF THE DRAWING

Comprehension of the invention is facilitated by reading the following detailed description in conjunction with the annexed drawing, in which.

DETAILED DESCRIPTION OF THE INVENTION

Figure 1:
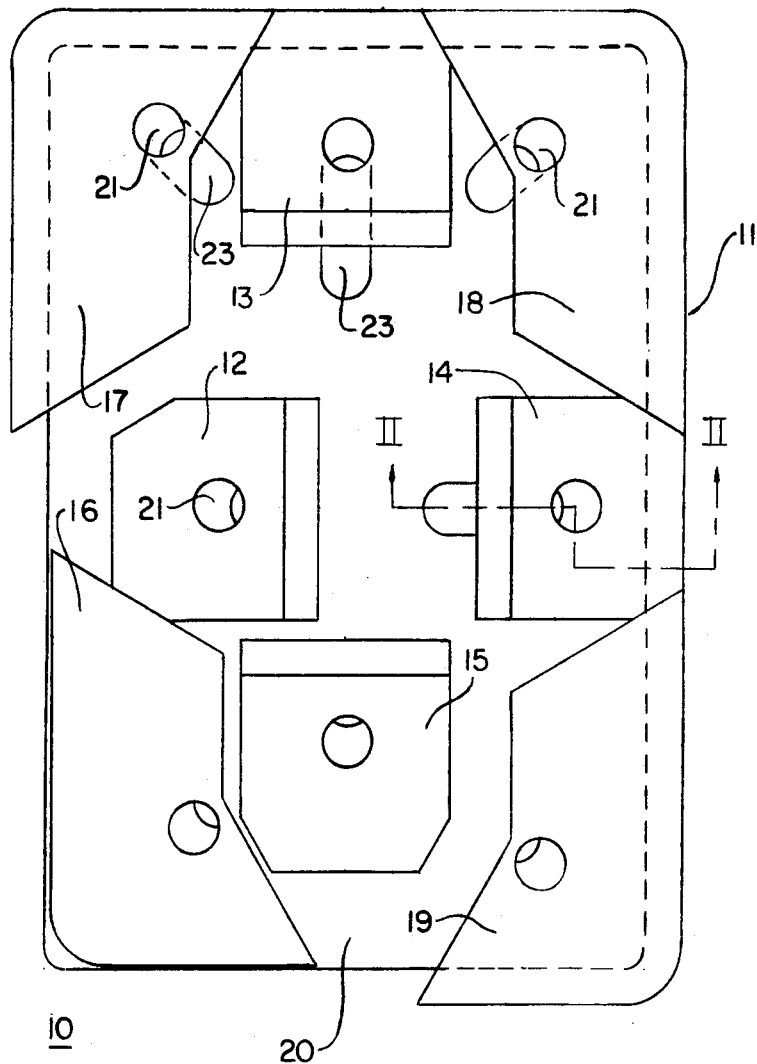
FIG. 1 is a schematic top plan view of the wall segments used in a specific illustrative embodiment of the invention.

FIG. 1 is a simplified, schematic representation of a specific illustrative embodiment of the invention showing an arrangement of sliding members 10. In this specific illustrative embodiment, eight sliding wall members are shown to organize a substantially continuous surface 11. The sliding wall members are essentially of two types in this embodiment. Specifically, wall members 12, 13, 14, and 15 form central sections of the substantially continuous surface, and wall members 16, 17, 18, and 19 form corner sections.

As shown in the figure, wall sections 17, 13, 18, 14, and 19 are arranged to be substantially radially outwardly displaced to form the substantially continuous surface. However, for sake of illustration, wall sections 12, 15, and 16 are shown radially inwardly withdrawn such that their corresponding portions of the substantially continuous surface is collapsed. In practice, however, all of the wall members would be either extended radially outwardly, or withdrawn radially inwardly, together.

In this embodiment, the wall members are disposed on a mold plate 20 provided with slots therein. Each of the wall sections is provided with an aperture 21 therethrough which is arranged to register with a respective one of slots 23 in mold plate 20. A plurality of pin members (not shown in this figure) are arranged to pass through respectively associated ones of apertures 21 and slots 23. In a preferred embodiment, substantially continuous surface 11 is provided with a plurality of grooves (not shown in the figure) which are segmented by the various wall members.

Figure 2:
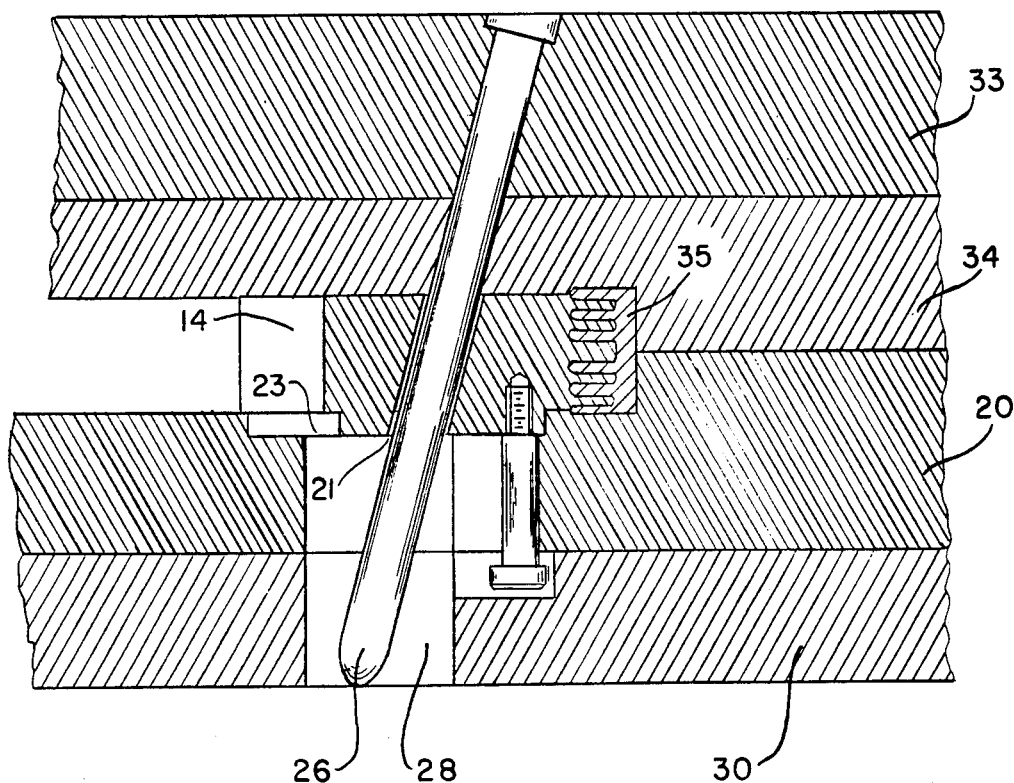
FIG. 2 is a partially cross sectional representation of an actuator arrangement for the embodiment of FIG. 1 showing the manner in which the wall segments are urged substantially radially outwardly.

FIG. 2 is a partially cross-sectional representation of an embodiment of the invention showing a wall member, such as wall section 14, of FIG. 1. The representation of this wall section in FIG. 2 is taken along a plane defined by line II-II in FIG. 1. However, FIG. 2 shows additional structural elements which are not shown in FIG. 1.

As shown in FIG. 2, a sliding pin 26 is passed through aperture 21 of wall section 14, slot 23 of mold plate 20, and into an aperture 28 of a platen member 30. As an upper platen member 33 and an associated upper mold plate 34 are moved upwardly, sliding pin 26 urges wall 14 leftwardly, or radially inwardly away from an article 35 which is being molded. In this figure, the grooves and ribs of the wall section which were discussed above with respect to FIG. 1 are visible and are seen to produce an internally ribbed structure for the article.

Figure 3:
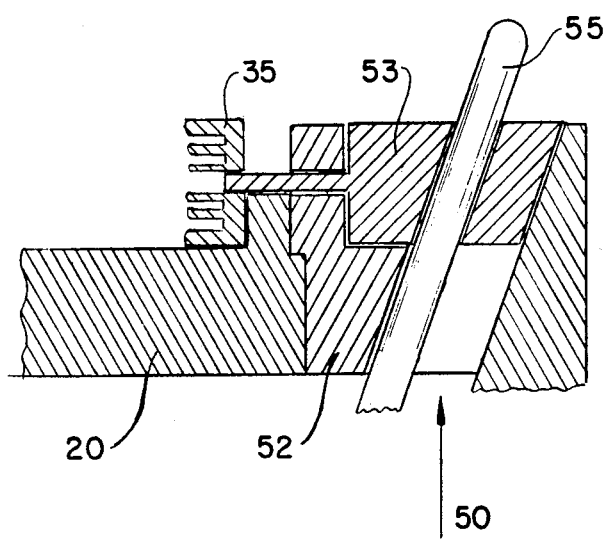
FIG. 3 is a partially cross sectional representation of a specific illustrative embodiment of a combination slot core and ejection arrangement constructed in accordance with the invention.

FIG. 3 is a partially cross-sectional and simplified schematic representation of an embodiment of a combined slot core and ejector arrangement which can be used in the practice of the invention described above with respect to FIGS. 1 and 2. As shown in FIG. 3, after the wall members have been withdrawn radially inwardly and removed by the raising of upper platen 33, a conventional actuator pin (not shown) may be used to apply a force in the direction of arrow 50 to a lifter block 52. The resulting upward displacement of lifter block 52 causes a slot core member 53 to be moved correspondingly upward. However, such upward movement of the slot core produces a corresponding upward displacement of molded article 35, thereby freeing the molded article from mold plate 20.

Continued upward motion of lifter block 52 and slot core member 53 causes the slot core member to be moved rightwardly by operation of its communicating with an ejector pin 55. The resulting rightward displacement of the slot core member causes the decoupling of the slot core member from the molded article.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention, and should not be construed to limit the scope thereof.

What is claimed is:

1. A mold system which forms a substantially sealed hollow volume for receiving a molding material in a molten state, the mold system comprising:

a first mold portion for forming a portion of the hollow volume, said first mold portion forming an outermost surface of the substantially sealed hollow volume, said outermost surface being closed onto itself, a second mold portion for communicating with said first mold portion and forming the substantially sealed hollow volume, said second mold portion being formed of a plurality of mold segments each having an outer volume-facing portion and a inner portion and being displaceable between respective first and second positions whereby when said mold segments are each in their respective first positions, said outer volume-facing portions form at least one substantially continuous innermost surface which faces into and substantially seals the substantially sealed hollow volume for communicating with the molten material and said inner portions define therebetween a free interior space devoid of any means therein in actuating engagement with said plurality of mold segments of said second mold portion, and when said mold segments are in their respective second positions, the substantially sealed hollow volume is unsealed for facilitating removal of the molten material in a solidified state and said inner portions are located within the confines of said otherwise free interior space; and actuator means coupled to each of said mold segments for displacing the mold segments between their respective first and second positions.

2. The mold system of claim 1 wherein said substantially continuous innermost surface comprises at least one continuous longitudinal rib portion extending inwardly with respect to the substantially sealed hollow volume.

3. The mold system of claim 1 wherein said actuator means further comprises a plurality of sliding pin members, each of said sliding pin members being associated with a respective one of said mold segments and extending therethrough at a predetermined angle with respect to a major plane of said second mold portion.

4. The mold system of claim 3 whereby displacement of said sliding pin members in a direction substantially orthogonal with respect to said major plane of said second mold portions results in displacement of said mold segments between said first and second positions.

5. The mold system of claim 4 wherein said mold segments are displaced between said first and second portions along respective directions of travel which are substantially radial with respect to a central region of said second mold portion.

6. The mold system of claim 1 wherein said mold segments each contain at least one sliding surface for communicating slidably with an adjacent one of the mold segments.

7. The mold system of claim 1 wherein there is further provided ejection means for removing molding material in said solidified state from the first mold portion when said mold segments of said second mold portion are each in said second position.

8. The mold system of claim 7 wherein said ejection means further comprises:
   an ejection core for communicating with the molding material; and
   ejection actuator means for displacing said ejection core whereby the molding material is ejected from the first mold portion.

9. The mold system of claim 8 wherein said ejection actuator means further comprises angled slide means for controlling a direction of displacement of said ejection core in response to said ejection actuator means whereby said communication between said ejection core and the molding material is decoupled.

10. The mold system of claim 8 wherein said ejection core penetrates into the molding material for forming a slot therein.

11. An injection molding arrangement comprising:
   a continuous outer wall for defining an outermost extent of an article to be molded; and
   a plurality of wall segments which are displaceable substantially radially outward for forming an inner wall and substantially sealably engaging with said outer wall for forming an enclosed region having a configuration corresponding to an article to be molded, said wall segments being displaceable substantially radially inwardly in an otherwise free space of an interior hollow chamber for collapsing said inner wall and permitting access to said enclosed region, said free space being devoid of any means in actuating engagement with said wall segments.

12. The injection molding arrangement of claim 11 further comprising an actuation arrangement coupled to said plurality of wall segments for displacing said wall segments substantially radially outwardly and inwardly.

13. The injection molding arrangement of claim 12 wherein said actuation arrangement comprises canted displacement means for communicating with said wall segments and an actuator, whereby said substantially radial displacement of said wall segments is responsive to a corresponding orthogonal displacement of said actuator.

14. The injection molding arrangement of claim 12 wherein there is further provided:
   first platen means for holding said continuous outer wall; and
   second platen means movable with respect to said first platen means for carrying said actuation arrangement.

* * * * *